(12) United States Patent
Macchi (10) Patent No.: US 8,442,231 B2
(45) Date of Patent: May 14, 2013

(54) METHOD AND SYSTEM FOR IMPROVING ROBUSTNESS OF SECURE MESSAGING IN A MOBILE COMMUNICATIONS NETWORK

(75) Inventor: Ilario Macchi, Rome (IT)

(73) Assignee: Telecom Italia S.p.A., Milan (IT)

( * ) Notice: Subject to any disclaimer, the term of this patent is extended or adjusted under 35 U.S.C. 154(b) by 438 days.

(21) Appl. No.: 11/632,859

(22) PCT Filed: Jul. 22, 2004

(86) PCT No.: PCT/EP2004/051581
§ 371 (c)(1),
(2), (4) Date: Aug. 6, 2008

(87) PCT Pub. No.: WO2006/007879
PCT Pub. Date: Jan. 26, 2006

(65) Prior Publication Data
US 2008/0292101 A1      Nov. 27, 2008

(51) Int. Cl.
*H04L 29/06* (2006.01)
(52) U.S. Cl.
USPC .......................................... 380/270; 713/150
(58) Field of Classification Search .................. 380/270; 713/150
See application file for complete search history.

(56) References Cited

U.S. PATENT DOCUMENTS

| | | | |
|---|---|---|---|
| 4,972,478 A | 11/1990 | Dabbish | |
| 5,909,491 A * | 6/1999 | Luo | 380/270 |
| 6,041,123 A * | 3/2000 | Colvin, Sr. | 713/153 |
| 6,741,704 B1 * | 5/2004 | Virtanen | 380/247 |
| 7,269,261 B1 * | 9/2007 | Jennings | 380/286 |
| 2009/0034721 A1 * | 2/2009 | Yan et al. | 380/42 |
| 2009/0210936 A1 * | 8/2009 | Omar et al. | 726/14 |

FOREIGN PATENT DOCUMENTS

| | | |
|---|---|---|
| EP | 1 035 684 A2 | 9/2000 |
| WO | WO 95/34970 | 12/1995 |
| WO | WO 99/04583 | 1/1999 |
| WO | WO 00/48416 | 8/2000 |
| WO | WO 02/17659 A1 | 2/2002 |
| WO | WO 03/003772 A2 | 1/2003 |

OTHER PUBLICATIONS

"Digital cellular telecommunication system (Phase 2+)"; Universal Mobile Telecommunications System (UMTS); Security Mechanisms for the (U)SIM application toolkit; Stage 2 (3GPP TS 23.048 version 5.7.0 Release 5), ETSI TS 123 048, vol. 3-T3, No. V570, pp. 1-37 (Jun. 2003).
NIST (National Institute of Standards and Technology: "FIPS PUB 46-3: Data Encryption Standard (DES)", Federal Information Processing Standards Publication, pp. 1-22, (Oct. 25, 1999).

* cited by examiner

*Primary Examiner* — Farid Homayounmehr
*Assistant Examiner* — Lisa Lewis
(74) *Attorney, Agent, or Firm* — Finnegan, Henderson, Farabow, Garrett & Dunner, L.L.P.

(57) ABSTRACT

A mobile communications network has mobile communications capabilities and supports a secure messaging service, such as an SMS messaging service, that allows a message sender and at least one message receiver (at least one among the message sender and the message receiver being a user of the mobile communications network) to exchange messages encrypted by means of a cryptographic process performed by the message sender, so as to obtain an encrypted message that can be decrypted by a corresponding cryptographic process performed by the intended message receiver. End-to-end security of the exchanged message is thus achieved. A cryptographic algorithm, exploited by the user of the mobile communications network for performing the cryptographic process, is modified by exploiting the mobile communications capabilities of the mobile communications network. Robustness and reliability over time of the end-to-end security messaging is improved.

19 Claims, 5 Drawing Sheets

METHOD AND SYSTEM FOR IMPROVING ROBUSTNESS OF SECURE MESSAGING IN A MOBILE COMMUNICATIONS NETWORK

CROSS REFERENCE TO RELATED APPLICATION

This application is a national phase application based on PCT/EP2004/051581, filed Jul. 22, 2004, the content of which is incorporated herein by reference.

FIELD OF THE INVENTION

The present invention relates generally to the field of telecommunications, and particularly to wireless, mobile communications networks, particularly mobile telephony networks such as GSM and UMTS networks (and their counterparts in the United States and Japan). More specifically, the invention focuses on messaging over a mobile communications network, and concerns methods (and related systems for the implementation thereof) that relies on encryption for making the messaging secure.

BACKGROUND OF THE INVENTION

In the past decade, mobile telephony networks have experienced an enormous spread, especially after the introduction of second-generation mobile cellular networks, and particularly digital mobile cellular networks such as those complying with the Global System for Mobile communications (GSM) standard (and its United States and Japanese counterparts).

Mobile telephony networks were initially conceived for enabling voice communications, similarly to the wired, Public Switched Telephone Networks (PSTNs), but between mobile users. The services offered by these networks, especially the digital ones, in addition to plain voice communications have however rapidly increased in number and quality.

In particular, a very popular service offered by GSM networks is the Short Message Service (SMS). This service offers to the users of a GSM network the possibility of exchanging short messages.

An SMS message normally includes a payload field, whose maximum length is relatively small, typically 140 Bytes. The SMS message can be a text message, or a data message. A text SMS message is an SMS message that carries, in the payload field, a string of alphanumeric characters; adopting an eight-bits coding for the alphanumeric characters, a string of 140 characters can be sent in a single message, whereas by coding the alphanumeric characters over 7 bits, text messages of up to 160 characters can be sent. A data SMS message is an SMS message that carries data for, e.g., a software application resident in the intended destination mobile phone, such as the WAP browser or the ringing tone player; network operators use for example data SMS messages to deliver data for specific applications running in the mobile phones of the subscribers.

In very general terms, the SMS operates in the following way: the SMS message is sent, from the mobile station (i.e., the mobile phone) of the user originating the message, to a SMS center, which manages the delivery of the SMS message to the intended destination user. To perform this task, the SMS center works in a "store & forward" way: in case the SMS message received from the origin mobile station cannot be delivered to the intended destination mobile station, for example because the latter is temporarily unavailable, e.g. because switched off or out of coverage, the SMS message is stored at the SMS center, which retries to deliver the SMS message at a later time, typically as soon as the destination mobile station becomes available.

This conventional implementation of the SMS is affected by some problems, relating to security issues, which make the SMS messaging unsuitable for specific applications, such as for example electronic commerce ("e-commerce") via mobile phones (when for example sensitive data such as credit card numbers need to be provided by the users), or, simply, when there is the need to guarantee an adequate level of privacy of the text messages exchanged between different users.

Under this respect, a point of real weakness in the system is represented by the storage of the messages at the SMS center.

Another weak point resides in the fact that the plain text of the SMS message travels along the telecommunications network, the information traveling in encrypted form only through the wireless path ("airlink") between the sender/receiver mobile station and the competent Base Transceiver Station (BTS) of the GSM network; thus, unauthorized third parties, using relatively simple equipment such as a digital receiver, may read the message content when this travels in the ground GSM network.

In the art, the problem of messaging security has already been recognized and faced.

For example, in the International application No. WO 00/48416, the problem of how to produce a secure and encrypted message traffic between applications on the SIM (Subscriber Identity Module) of the mobile telephone and service provider applications is recognized, and a method and system making possible to implement secure message communication with a mobile station are disclosed. In particular, a distinct SIM space is set apart for storage of the keys needed for the encryption/decryption and/or signature of messages, and new encryption keys can be loaded into such a SIM space via an "On The Air" (OTA) interface. As stated in that document, the OTA interface makes it considerably easier to set new encryption/decryption keys on the SIM.

As another example, the International application No. WO 99/04583 discloses a method providing a functionality that allows mobile stations of users having certain access rights to display in intelligible form messages (short messages) broadcast on a common channel in a cell. The messages, before being broadcast, are encrypted using a predefined encryption key, and the mobile stations having a corresponding access right are provisioned with the corresponding decryption key. The decryption keys are transmitted to the mobile stations using a point-to-point data transfer protocol; in particular, in order to provision the mobile stations with the decryption key, a remote provisioning procedure is used, involving a remote SIM updating message being transmitted to the mobile station, or using the "data download via SMS-PP" data download procedure. In order to ensure long-term security of the encryption method, the encryption keys used to encrypt the message texts are periodically changed.

SUMMARY OF THE INVENTION

The Applicant observes that the solutions known in the art, although satisfactory under many respects and significantly improving the level of security of the conventional SMS messaging services, are however not free of problems.

In particular, the Applicant observes that while the problem of changing the encryption/decryption keys used for encrypting/decrypting messages has been faced in the art, nobody seems to have realized that this may be insufficient.

The Applicant has instead realized that it may happen that the cryptographic algorithm exploited by users, for example belonging to a users' group, for encrypting/decrypting SMS messages exchanged between the users may be cracked. If this happens, the end-to-end security and confidentiality of the SMS messages exchanged between the users can no longer be guaranteed. In order to restore the desired security level, it is not sufficient to update the encryption/decryption keys: as a consequence of the cracking of the cryptographic algorithm, merely changing the keys does not ensure the secrecy of the exchanged messages. In such situations, it might be necessary to replace the SIM cards of all the users of the group using the same cryptographic algorithm with new SIM cards, with a different cryptographic algorithm embedded therein. This is not an easy task, especially if the number of users in the group is relatively high, and may require shipping to all the users of the group a new, substitutive SIM card.

The Applicant has tackled the problem of how increasing the robustness of the message encryption systems and methods known in the art, so that they can resist relatively hard attacks.

The Applicant has found that such an increased robustness can be achieved if the cryptographic algorithm intended to run at the mobile stations for encrypting/decrypting the exchanged messages, e.g. SMS messages, is upgraded "Over-The-Air" (OTA). In this way, even if the cryptographic algorithm is cracked, or in cases where there is the reasonable doubt that the security of the system may have been broken or at least is in danger, it is no more necessary to replace all the SIM cards of the group of users enabled to exchange ciphertext messages.

In particular, the Applicant has found that distinctive advantages derive from exploiting a parametric cryptographic algorithm. For the purposes of the present invention, by parametric cryptographic algorithm there is intended any cryptographic algorithm offering the possibility of being configured via configuration parameters which specify the way the algorithm is implemented to encrypt/decrypt the data. A parametric cryptographic algorithm may be a cryptographic algorithm resulting by a specific one of several (at least two) possible combinations of variably combinable basic cryptographic algorithms or routines, the specific type of combination being determined by a set of one or more configuration parameters. It is worth pointing out that the cryptographic algorithm or the configuration parameters for the cryptographic algorithm are not to be confused with the encryption/decryption keys used by the algorithm to encrypt/decrypt a plaintext into a ciphertext: encryption/decryption keys can in fact be viewed as "inputs" to the cryptographic algorithm, just as the plaintext to be ciphered or the ciphertext to be decrypted, while the configuration parameters determines the very nature of the cryptographic process to be performed.

The Applicant has found that by using such a parametric cryptographic algorithm, flexibility is significantly increased, because instead of modifying the whole cryptographic algorithm (i.e., modifying one or more of the basic cryptographic routines that make up the cryptographic algorithm), it may in some cases suffice to modify (still OTA) the configuration parameters thereof, i.e. the specific way the various basic cryptographic routines are combined. In this way, the task of updating the cryptographic process performed at the mobile stations to encrypt/decrypt the exchanged messages is rendered even simpler (particularly, less data need to be delivered to the mobile stations for updating the cryptographic algorithm).

Thus, according to an aspect of the present invention, a method for increasing robustness of secure messaging in a wireless, particularly a mobile communications network is provided.

Summarizing, in a mobile communications network having mobile communications capabilities and supporting a secure messaging service that allows a message sender and at least one message receiver (at least one among the message sender and the message receiver being a user of the mobile communications network) exchanging messages encrypted by means of a cryptographic process performed by the message sender, so as to obtain an encrypted message that can be decrypted by a corresponding cryptographic process performed by the intended message receiver, the method according to this aspect of the present invention comprises modifying a cryptographic algorithm exploited by said user of the mobile communications network for performing said cryptographic process, wherein said modifying the cryptographic algorithm is accomplished by exploiting the mobile communications capabilities of the mobile communications network.

Preferably, said cryptographic algorithm comprises a parametric cryptographic algorithm, comprising at least two combinable basic cryptographic algorithms and configuration parameters defining a combination of the at least two basic cryptographic algorithms. Said modifying the cryptographic algorithm may thus comprise modifying at least one of the basic cryptographic algorithms, and/or modifying said configuration parameters defining a specific combination of the at least two basic cryptographic algorithms.

In a preferred embodiment of the present invention, the method may further comprise modifying encryption/decryption keys to be used by said user of the mobile communications network for encrypting/decrypting a message, said modifying the encryption/decryption keys being accomplished by exploiting the communications capabilities of the mobile communications network.

In particular, the at least one of the basic cryptographic algorithms, the configuration parameters and the encryption/decryption keys may be modified according to respective time schedules, e.g. the keys are modified more frequently, whereas the configuration parameters are modified less frequently, and the basic cryptographic algorithms are modified only from now and then.

The communications capabilities of the mobile communications network exploited for modifying the cryptographic algorithm may include a messaging service of the network, particularly an SMS service, or a packet radio service of the network, particularly a GPRS service.

According to another aspect of the present invention, a secure messaging system is provided.

The system comprises:

a mobile communications network having mobile communications capabilities and supporting a messaging service;

a message sender and at least one message receiver, wherein at least one among the message sender and the message receiver is a user of the mobile communications network;

a cryptographic process performed by the message sender to encrypt a message to be sent to the at least one receiver, and a corresponding cryptographic process performed by the message receiver to decrypt the encrypted message once received.

The mobile communications network is adapted to modify a cryptographic algorithm exploited by said user of the mobile communications network for performing said cryptographic process by exploiting the mobile communications capabilities thereof.

In particular, said cryptographic algorithm includes a parametric cryptographic algorithm, comprising at least two combinable basic cryptographic algorithms, and configuration parameters defining a combination of the at least two basic cryptographic algorithms; the mobile communications network is adapted to modify either one or the other or both of said basic cryptographic algorithm and configuration parameters.

In one embodiment of the present invention, the system includes a messaging security manager server connected to the mobile communications network, for managing modifications to the cryptographic algorithm. The messaging security manager server may in particular be adapted to communicating with the user of the mobile communications network via a network messaging service, particularly an SMS service, or via a network packet radio service, particularly a GPRS service.

According to the still another aspect of the present invention, a mobile station for use in a mobile communications network having mobile communications capabilities and supporting a messaging service is provided.

The mobile station is adapted to implement a cryptographic process for encrypting/decrypting messages to be sent to/received from a message destination/sender, and it is further adapted to have a cryptographic algorithm, exploited for performing said cryptographic process, modified by exploiting the communications capabilities of the mobile communications network, particularly one or both among a messaging service, particularly an SMS service, and a packet radio service, particularly a GPRS service.

In particular, the mobile station is further adapted to manage the cryptographic algorithm as a parametric cryptographic algorithm, including at least two combinable basic cryptographic algorithms, and configuration parameters defining a combination of the basic cryptographic algorithms. The mobile station may in this case be adapted to manage modifications of either one or both of the at least two basic cryptographic algorithms and the configuration parameters.

Preferably, the mobile station is further adapted to have encryption/decryption keys exploited by the cryptographic process for encrypting/decrypting messages modified by exploiting the mobile communications capabilities of the mobile communications network.

The mobile station may comprise a user terminal equipment and a Subscriber Identity Module operatively associated thereto. In one embodiment of the invention, at least one among the cryptographic process and operations for the modification of the cryptographic algorithm are performed by the user terminal equipment. In another embodiment of the invention, at least one among the cryptographic process and operations for the modification of the cryptographic algorithm, possibly both, are performed by the Subscriber Identity Module.

According to still another aspect of the present invention, a Subscriber Identity Module is provided, adapted to be operatively associated with a user terminal equipment for forming a mobile station adapted for use in a mobile communications network having mobile communications capabilities and supporting a messaging service, wherein the mobile station is adapted to implement a cryptographic process for encrypting/decrypting messages to be sent to/received from a message destination/sender.

The Subscriber Identity Module is adapted to have a cryptographic algorithm, exploited by the mobile station for performing said cryptographic process, modified exploiting the communications capabilities of the mobile communications network.

In particular, the Subscriber Identity Module may be further adapted to perform said cryptographic process.

BRIEF DESCRIPTION OF THE DRAWINGS

The features and the advantages of the present invention will be made apparent by the following detailed description of an embodiment thereof, provided merely by way of non-limitative example, description that will be conducted making reference to the attached drawings, wherein.

DETAILED DESCRIPTION OF PREFERRED EMBODIMENTS OF THE INVENTION

Figure 1:
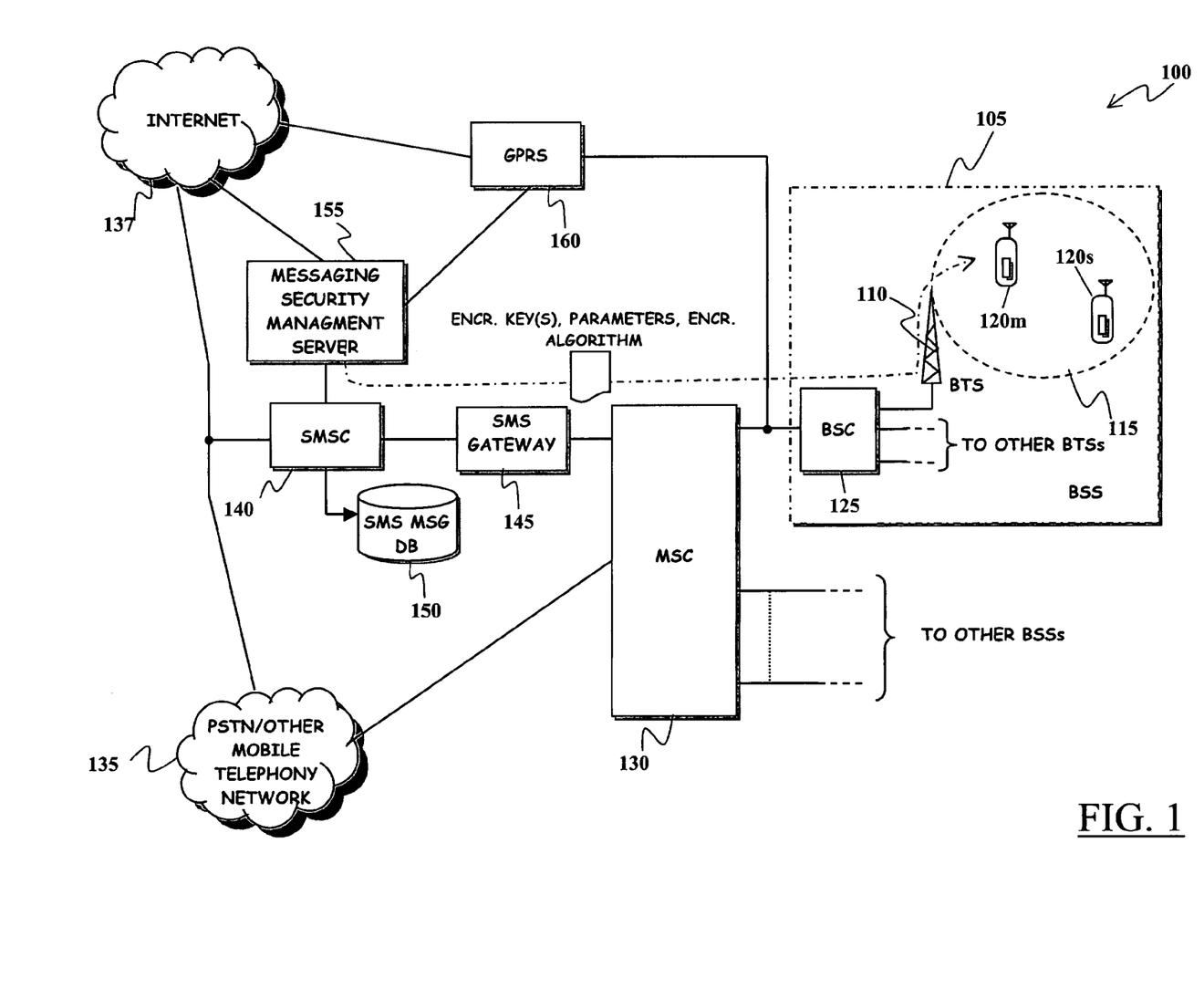
FIG. 1 schematically shows a GSM telephony network, supporting an SMS messaging service.

With reference to the drawings, particularly to FIG. 1, a wireless, particularly a mobile communications network, in particular a cellular mobile communications network 100, even more particularly (albeit this is not to be construed as limitative to the present invention, which is applicable irrespective of the particular network type) a GSM network, is schematically shown.

The mobile communications network 100 typically comprises a plurality of Base Station Subsystems (BSSs), each one providing coverage for cellular communications in a respective geographic region; for simplicity of the drawing, only one BSS is shown in FIG. 1, identified therein by 105.

The generic BSS, such as the BSS 105 shown in the drawing, normally comprises a plurality of Base Transceiver Stations (BTSs), each one covering a respective geographic area (a network "cell") within the region covered by the BSS; again, for simplicity of the drawing, only one BTS is shown in FIG. 1, schematically represented by an antenna identified by 110, and the associated cell is schematically depicted and identified by 115.

The generic BTS, such as the BTS 110, communicates with users' MSs, typically GSM cellular phones, or other user equipment adapted to access and be connected to the GSM network, such as for example Personal Digital Assistants (PDAs), pocket computers, portable computers and the like, which are located in the BTS's cell, such as the two MSs 120s (which in the following will be assumed to represent an SMS message sender mobile station) and 120r (in the following, an SMS message receiver mobile station) shown in FIG. 1 within the cell 115.

Typically, a plurality of BTSs are connected to a same Base Station Controller (BSC) that controls the BTSs; for example, all the BTSs of a same BSS are connected to a same BSC, such as the BSC 125 shown in FIG. 1. Roughly speaking, the BTSs handle the actual transmission/reception of signals to/from the MSs, whereas the BSC instructs the different BTSs of which data to transmit on specified radio communication channels, and performs at least part of the operations involved in the authentication of the MSs necessary to connect to the network.

The BSCs of the different BSSs, such as the BSC 125 of the BSS 105, are typically connected to a same Mobile Switching Center (MSC), such as the MSC schematically represented in FIG. 1 and identified by 130. The MSC 130 performs the function of gateway to other MSCs (not shown) of the cellular network 100, as well as to other communications networks such as one or more wired, fixed telephony networks (Public Switched Telephone Networks, shortly PSTNs) and/or one or more other mobile telephony (cellular) networks, all these other communications networks being globally identified by 135 in the drawing. As known in the art, the MSC is associated with a Home Location Register (HLR), containing subscription data of users subscriber to the mobile communications network 100, particularly mobile phone numbers, and with a Visitor Location Register (VLR), containing information on where the various users are, at a given point of time, located, i.e. under which cell of the network 100 they are currently registered.

The GSM network 100 implements a messaging service such as the SMS, offering to the users the possibility of exchanging short messages (hereinafter, SMS messages).

Without entering into excessive details, known per-se in the art, the messaging service is managed by a Short Message Service Center (SMSC) 140, generally connected to the MSC 130 via an SMS gateway 145.

The SMSC 140 may be, and preferably is, connected to the one or more fixed telephony networks (PSTNs) and/or one or more other mobile telephony (cellular) networks 135; the SMSC 140 may also be connected to a packet-based data communications network such as the Internet 137. In this way, SMS messages to a generic destination MS, registered under the network 100, can be sent not only by the user of an MS registered under the network 100, but also from an MS registered under a different mobile communication network, or from a suitable telephone set of a user connected to a PSTN, or even from the Personal Computer (PC), a PDA, a pocket computer or the like of a user connected to the Internet.

In order to transmit an SMS message from an SMS message sender, for example (but not at all limitatively) a generic MS connected to the network 100, e.g. the sender MS 120s, to an intended SMS message destination, such as for example the receiver MS 120r, the sender MS 120s sets up a signaling connection to the MSC 130, through the BTS 110 and the BSC 125, and the SMS message (after having been compiled at the sender MS) is then transmitted by the sender MS 120s to the SMSC 140, via the SMS gateway 145. From the SMSC 140, the SMS message is then delivered to the intended destination, in the example herein considered the receiving MS 120r, via a signaling connection: to this purpose, the SMS message is forwarded, via the SMS gateway 145, to the MSC in charge of the intended destination MS, in this example, for simplicity, the same MSC 130, which delivers the SMS message to the intended destination MS 120r, through the proper BSC and BTS, in the example herein considered, for simplicity, again the BSC 125 and BTS 110.

As mentioned in the introduction of the present description, the SMS is a "store-and-forward" service: if, at the time the SMS message is received at the SMSC 140, the destination MS 120r cannot be reached, for example because it is temporarily out of the coverage of the network's BSSs, or it is switched off, the SMS message cannot be delivered to the intended destination. The SMS message is thus stored at the SMSC 140, in a SMS message database 150 held by the SMSC 140, for allowing the SMSC 140 perform future delivery attempts, so that the SMS message can be delivered to the intended destination MS 120r as soon as possible, when the MS becomes available. To this purpose, an automatic "alert" process may be started at the MSC 130, which causes the SMSC 140 to be notified of when the destination MS 120r connects to the network 100.

In order to increase the level of security of the conventional, plain messaging service, encryption of the SMS messages is implemented, by providing the sender and the receiving MSs with an SMS message cryptographic engine capable of encrypting/decrypting the SMS messages to be sent/received, based on a specified cryptographic algorithm, working with encryption/decryption keys. Any one of the known cryptographic processes may in principle be used, performing either a symmetric encryption/decryption (a cryptographic process wherein single key is used for both encrypting and decrypting the message) or an asymmetric encryption/decryption (an encryption/decryption scheme that uses a couple of keys: a public key, used for encrypting the plaintext, and a corresponding private key for decrypting the ciphertext).

In particular, according to an embodiment of the present invention, the possibility is offered to, e.g., the network operator, such as the operator of the network 100, of modifying, more or less heavily, depending on the needs or desires, the way in which the cryptographic (encryption/decryption) process is carried out, in an OTA way, i.e. exploiting the communications capabilities of the mobile communications network 100.

Even more particularly, according to an embodiment of the present invention, in case parametric cryptographic algorithms are used at the mobile stations for encrypting/decrypting messages, the cryptographic algorithm resident in a generic mobile station can be substituted tout court with a different cryptographic algorithm, or at least the configuration parameters of the cryptographic algorithm running on the MSs can be modified.

Preferably, in addition to the possibility of upgrading/updating OTA the cryptographic algorithm, an OTA encryption/decryption key(s) updating is also envisaged.

According to an embodiment of the present invention, in the mobile communication network 100 a messaging security management server 155 is provided, located for example (albeit not limitatively) in the core network 100.

The security management server 155 manages in particular the operations of modifying (updating/upgrading) the way in which the cryptographic process is carried out in the MSs, as described in detail later on through an example; in particular, the security management server 155 manages the operations that allow substituting the cryptographic algorithm resident in the MSs with a completely different one, and/or changing configuration parameters for the (parametric) cryptographic algorithm. Preferably, the security management server 155 also manages the operations that allow changing the encryption/decryption key(s) used by the cryptographic algorithm for obtaining a ciphertext message from a plaintext message, and viceversa.

The security management server 155 may communicate with the MSs in any suitable way, for example via SMSs (and to this purpose the server 155 is connected to the SMSC 140), and/or by GPRS data packets through a GPRS connection, where supported (in FIG. 1, a block 160 is representative of all the network components necessary for implementing the GPRS in the network 100).

Preferably, the security management server 155 may be connected to the Internet 137, and may offer an interface, e.g. a Web interface, exploitable for example by a security administrator for performing management operations such as management of new users registering to the secure SMS message service, causing the cryptographic algorithm configuration parameters stored in one or more MSs subscriber of the service to be updated, selection of new cryptographic algorithms to be downloaded to the MSs, creation of new service profiles (e.g., creation of new subscriber users' groups that can exchange secure end-to-end messages, sharing the cryptographic algorithms and keys, or managing already existing users' groups, e.g. by adding or deleting users), management of billing data.

Figure 2:
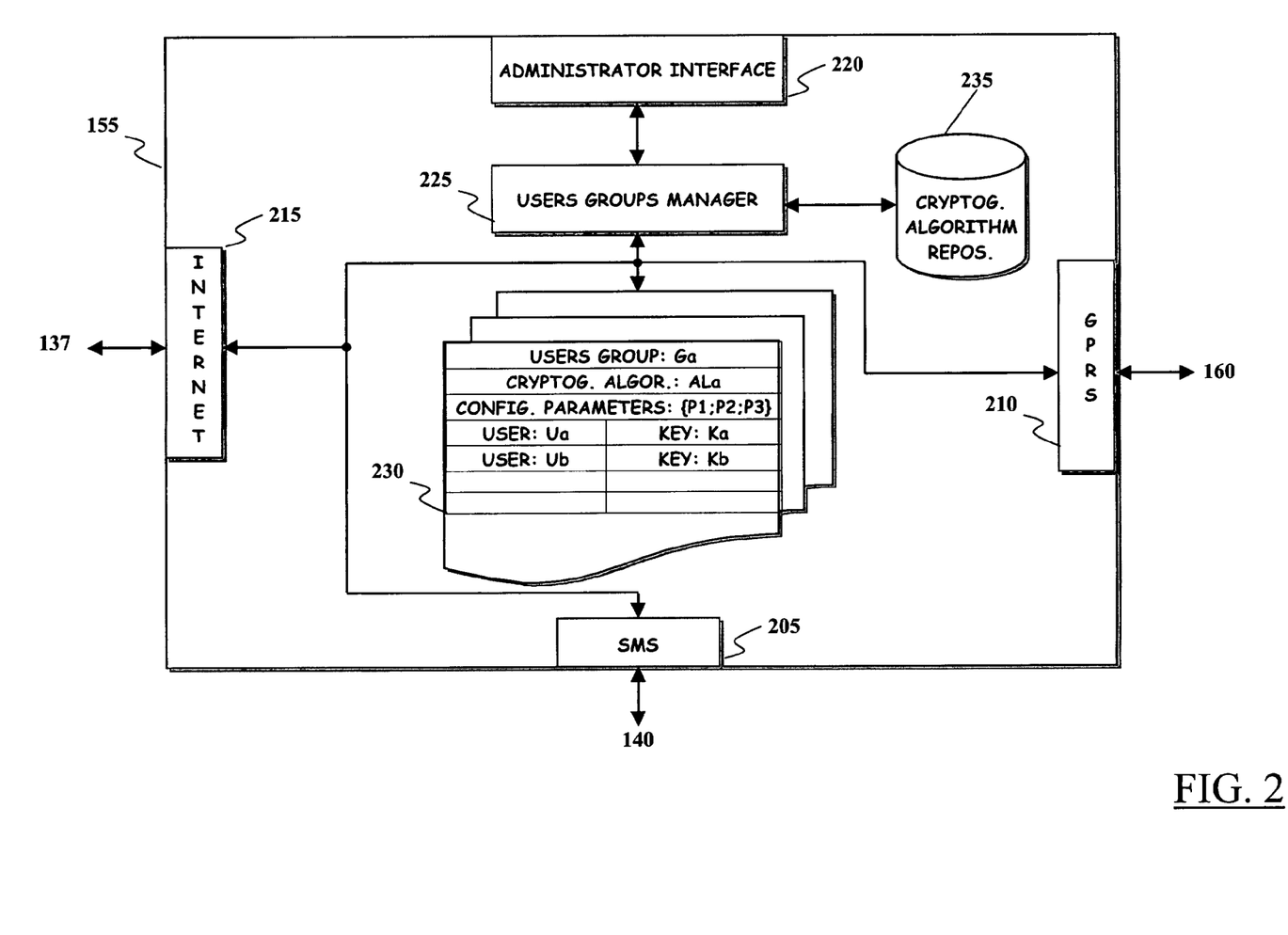
FIG. 2 illustrates very schematically a security management server that, in one embodiment of the present invention, is provided in the GSM telephony network for managing operations such as updating/upgrading cryptographic algorithms resident in the mobile stations.

FIG. 2 illustrates a possible implementation of the security management server 155, in one embodiment of the present invention. The server 155 is depicted very schematically, in terms of functional blocks relevant to the present description; it is to be understood that at least some of the functions of the server 155 will be in the practice implemented by hardware components, by software components or by a mix of hardware and software.

The server 155 includes communication interface units or modules 205, 210, 215, enabling communications via SMS messages (unit 205, that allows interfacing the server 155 with the SMSC 140) or via the GPRS (unit 210, that allows connecting the server 155 to the GPRS structure 160 of the network 100), and for interfacing with the Internet 137 (unit 215).

The server 155 also includes an administrator interface unit 220, for interfacing with an administrator (the security manager). In particular, through the interface unit 220, the security manager may interact with a users groups manager unit 225. The users groups manager unit 225 is in particular responsible of managing a database 230 of groups of users that are subscribers to the secure SMS messaging service, i.e. users registered at the security server 155. The generic users group is identified by a group identifier (e.g., "Ga" in the drawing), and includes all the users that are enabled to exchange encrypted messages with each other; in the database 230, for the generic users group, e.g. the group "Ga", a cryptographic algorithm (identifier—"ALa" in the drawing) is defined, corresponding to the cryptographic algorithm that is resident on the MSs of the users of the group. Additionally, a listing of the (identifiers of the) users is provided ("Ua", "Nb" in the drawing), and for each user there is defined the respective encryption/decryption key.

A cryptographic algorithms repository 235 is also held at the server 155, from which the users' group manager 225 can take new algorithms to be associated with a given users group.

The manager 225 is the functional unit capable of communicating (via the communication interface modules 205, 210, 215, and the corresponding carriers) with the MSs, so as to transfer information for updating/upgrading the cryptographic process to be performed by them.

It is observed that a users' group may include from as few as two users, to a large number of users (for example, the employees of a company, or of a government agency, or of a department thereof).

FIG. 3 shows, once again in an extremely simplified way and in terms of functional blocks relevant to the understanding of the exemplary invention embodiment herein considered, a generic MS 120 adapted to implement an SMS message encryption method according to an embodiment of the present invention. In particular, the MS depicted in FIG. 3 may be the sender MS 120s or the receiving MS 120r of FIG. 1.

Figure 3:
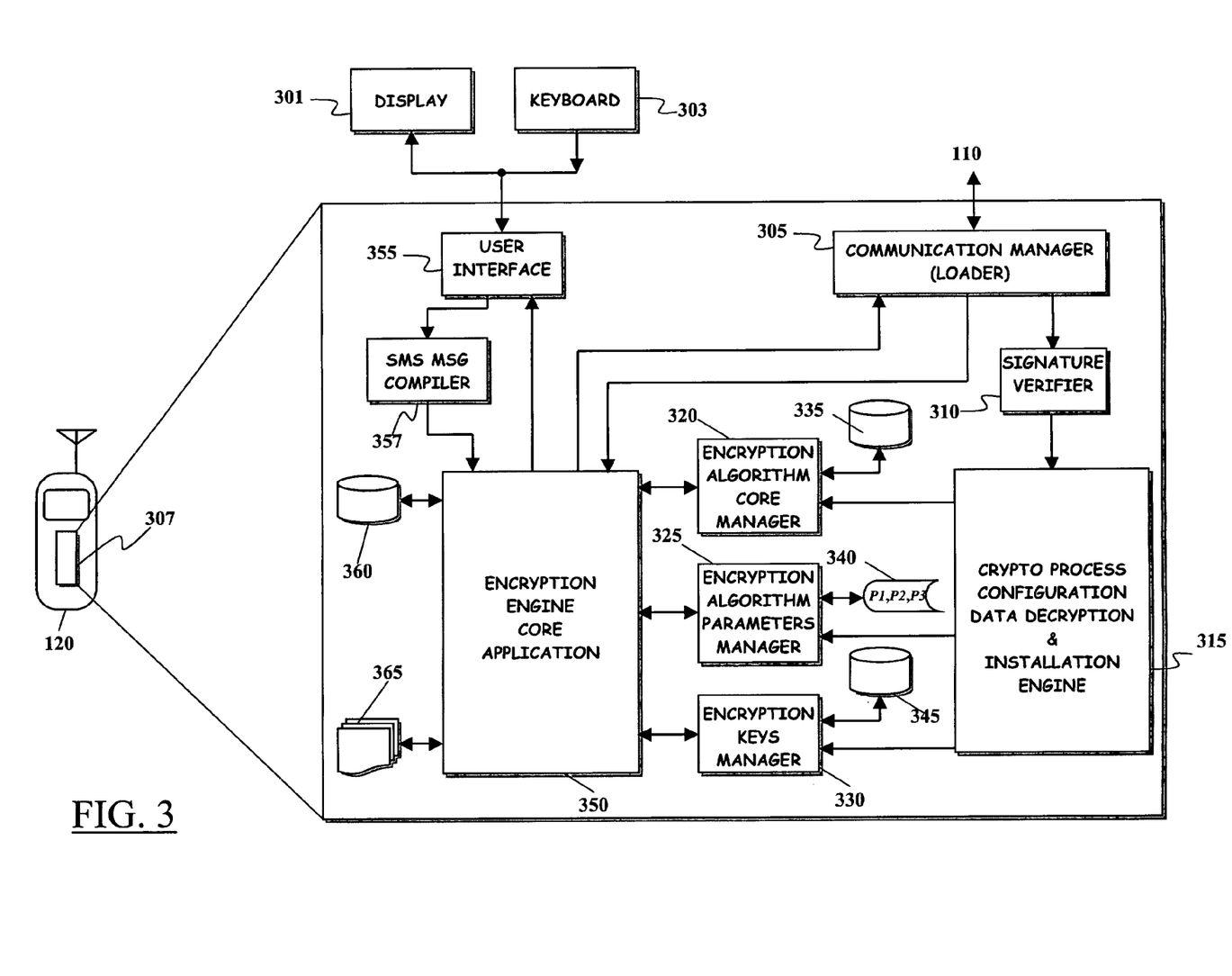
FIG. 3 schematically shows, in terms of functional blocks relevant to the understanding of the exemplary invention embodiment to be described, a Mobile Station (MS) implementing the method according to the described embodiment of the present invention.

As known in the art, the MS 120 may be viewed as the combination of a user terminal (typically, a mobile phone) and a Subscriber Identity Module (SIM). The user terminal comprises, in addition to specific elements allowing radio communications with the BTSs in accordance to the GSM specifications, a keyboard 301, a microphone and a loudspeaker (not shown), a display device 303 and a programmable data processing unit, particularly a microprocessor, with dynamic and non-volatile memory resources. The user terminal interacts with the Subscriber Identity Module (SIM) 307, which is a smart-card module removably associated with the user terminal and having its own data processing and storage capabilities, originally provided for authentication purposes of the MS in the mobile communication network. It is intended that at least some of the functions that will be described hereinafter are implemented in terms of software run by the data processing units of the user terminal and/or of the SIM 307. In particular, in a preferred but not at all limitative embodiment of the present invention, the SMS message encryption/decryption functions described hereinafter are performed by one or more software applications resident on the MS's SIM 307: in this way, no structural changes to the user terminal are needed, and the functions can be implemented even in already existing, commercially-available mobile phones, by simply providing their users with a new SIM card. In particular, the SMS message encryption/decryption functions may be implemented as a SIM Application Toolkit (SAT), which is an extension of the functions of a conventional SIM card, allowing the SIM card 307 to be programmed so as to be capable of carrying out new, different functions in addition to plain authentication of the MS.

In greater detail, making reference to FIG. 3, a first module 305 manages in general the communications of the MS 120, at least as far as the encrypted SMS messages and the configuration messages of the cryptographic process are concerned. In particular, this first module 305 manages the receipt/delivery by the MS 120 of encrypted SMS messages sent by/to be sent to intended recipients, e.g. one or more other MSs; the first module 305 also manages the communications of the MS 120 with the security management server 155, for the purposes of modifying the cryptographic process carried out for encrypting messages to be sent/decrypting received messages. Even more particularly, the first module 305 manages the flow of information coming from the security management server 155, selecting the appropriate communication channel (e.g., SMS, GPRS, or the like); in case the information from the server 155 for modifying the cryptographic process is received in successive blocks (for example, in successive SMS messages, or in successive GPRS radio data blocks) the first module 305 is responsible of maintaining the correct message sequence. In particular, the first module 305 may include a loader module, of the type already known in the art and provided on-board of specific SIMs, capable of downloading scripts.

The first module 305 is in particular capable of discriminating whether the incoming message is an (encrypted) SMS message, sent by, e.g., another MS (the sender MS), or, differently, the incoming message is a cryptographic process management message, i.e. a message sent by the security management server 155, carrying data directed to modifying the cryptographic process implemented at the MS 120 under consideration.

Figure 4A:
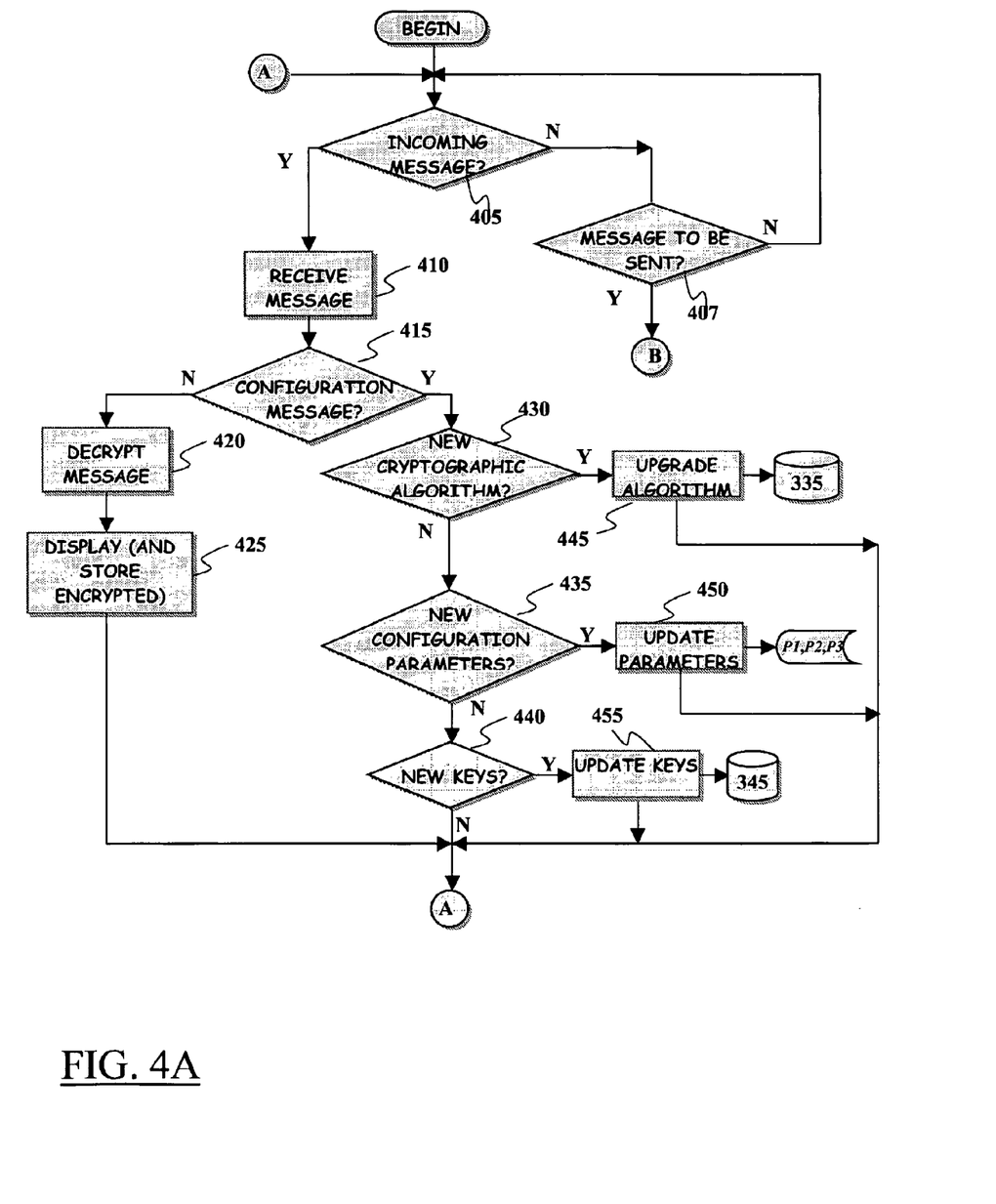
FIG. 4A is a schematic flowchart showing, in very simplified way, the operation of a generic MS in respect of the operations allowing to update/upgrade the cryptographic process that the MS is capable of performing, in one embodiment of the present invention.
Figures 4B, 5:
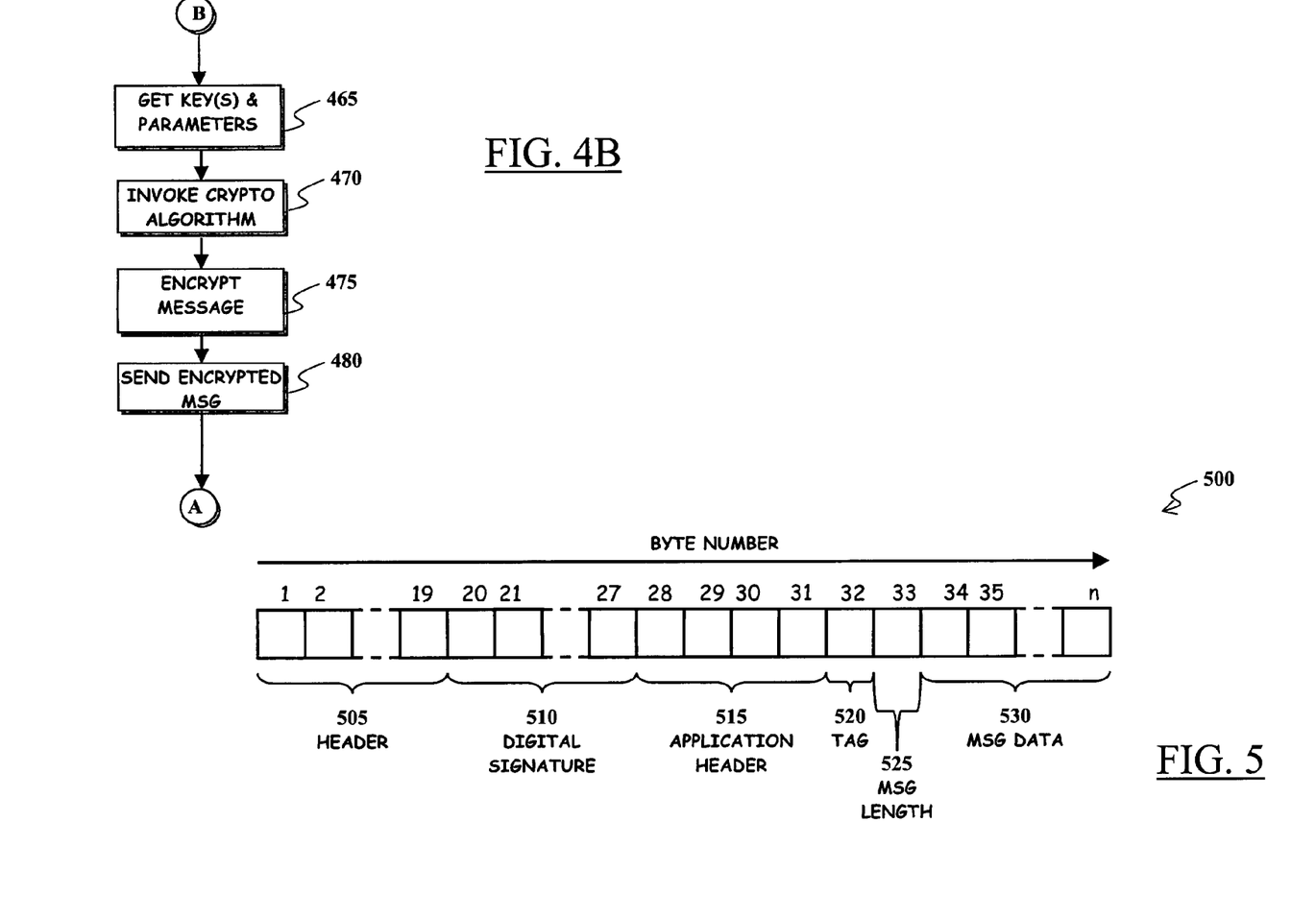
FIG. 4B is a schematic flowchart showing, in very simplified way, the operation of the generic MS as far as the management of secure SMS messages is concerned, in one embodiment of the present invention.
FIG. 5 schematically shows the structure of SMS messages used for updating/upgrading, over-the-air, the cryptographic process that the MS, in one embodiment of the present invention.

The general structure of a cryptographic process management message, particularly an SMS management message 500, is schematically shown in FIG. 5, in one embodiment of the present invention. The managing message includes a message header field 505 (for example, of nineteen bytes, as specified in the GSM 03.48 Technical Specification); preferably, a digital signature field 510 (for example of eight bytes) is included, adapted to transport a digital signature of the sender. The management message further includes an application header field 515 (of four bytes, in the shown example), a tag field 520 (of one byte in the example), specifying the nature of the management message, a message length field 525 (also of one byte in the example), specifying the length of the message, particularly the length of the message data field), and a message data field 530 (of variable length, depending on the type of message), transporting the message payload.

In particular, in an embodiment of the present invention, the first module 305 discriminates whether the incoming message is an (encrypted) SMS message, sent by, e.g., another MS, or a cryptographic process management message by looking at the message tag field 520. The value of the tag field 520 also allows establishing the nature of the data carried by the data field 530, i.e. whether the data field 530 carries a new cryptographic algorithm (in this case, several SMS messages will probably be required to complete the upgrading process), or new configuration parameters for an existing cryptographic algorithm, or simply updated encryption/decryption keys.

Back to FIG. 3, the first module 305 may interact with a second module 310, which is provided in a preferred invention embodiment and is responsible of verifying the identity of the sender of a received cryptographic process management message. In particular, management messages sent by the security management server 155 are "digitally signed", i.e. they have a digital signature (in the digital signature field 510) that certifies the authenticity of the message sender. In an embodiment of the present invention, whenever an incoming SMS message is received by the MS 120 and the first module 305 recognizes that the incoming message is a management message, i.e. a message coming from the security management server 155 and carrying configuration data for the cryptographic process (similar considerations apply to the case the configuration data are received over a GPRS connection), the received configuration message is thus passed to the second module 310. Exploiting security and digital signature algorithms, the second module 310 is capable of establishing the authenticity of the information carried by the received message, i.e. of ascertaining whether the true sender of the message is, as expected, the security server 155.

If the second module 310 finds that the digital signature of the received message is not valid, the incoming message is rejected, and not processed any further. If instead the digital signature is found to be valid, the second module 310 passes the (data carried by the) received message to a third module 315, that extracts the relevant information from the received message, and takes care of installing (i.e., making operative) the new cryptographic process configuration carried by the message.

In particular, in an embodiment of the present invention, not only is the management message received by the security management server 155 digitally signed, but the cryptographic process configuration data carried by the message may also encrypted. In this case, the third module 315 takes care of decrypting the encrypted data, so as to extract the new cryptographic process configuration to be installed. It is observed that the decryption process carried out by the third module 315 for decrypting the received management message may in principle be based on the same cryptographic algorithm used by the MS 120 for encrypting/decrypting SMS messages, although this is not limitative to the present invention, and a distinct cryptographic process may as well be used.

According to an embodiment of the present invention, the third module 315 interacts with a fourth module 320, a fifth module 325 and a sixth module 330.

The fourth module 320 manages and controls the code of the various cryptographic algorithms. In particular, a generic cryptographic algorithm may be viewed as a combination of a number of primitive functions (or basic cryptographic algorithms), which are managed, and whose execution is controlled, by the fourth module 320. The fourth module 320 exploits the (decrypted) information received from (and installed by) the third module 315 in order to implement a new cryptographic algorithm, based on the operating system running in the MS and supporting the software applications. In particular, in an embodiment of the present invention, more than one, e.g. two or more cryptographic algorithms may be installed in the MS 120: for example, the MS 120 may exploit one cryptographic algorithm for secure messaging with a first group of users, and a different cryptographic algorithm for secure messaging with a second group of users. The fourth module 320 manages the code of all the implemented algorithms, updates the currently installed cryptographic algorithm(s) to a new algorithm version. Also, the module 320 takes care of removing, from a cryptographic algorithm database 335, unused cryptographic algorithms.

Having in mind the general management message structure shown in FIG. 5, an exemplary management message carrying (presumably a portion of a new cryptographic algorithm is the following:

| header | digital signature | application header | tag | msg length | msg data |
|---|---|---|---|---|---|
| 02 70 00 00 21 0D 00 00 30 30 FE F3 01 00 00 00 00 00 00 | 1F AF 38 CA D0 37 1B F6 | 32 00 00 00 | 01 | 05 | 41 42 43 44 45 | wherein the tag field being equal to "01" hexadecimal (hex) means that the message is intended to modify the cryptographic algorithm, and the data field carries five bytes (message length field equal to 05 hex), of value 41, 42, 43, 44 and 45 hex in the shown example. Typically, several of these messages will be required for modifying a cryptographic algorithm.

The fifth module 325 is instead responsible of managing and controlling the configuration parameters to be used by the (selected) cryptographic algorithm, whose implementation is controlled by the fourth module 320. In particular, the fifth module 325 processes the data structure coming from the module 315 so as to put the data into a form suitable for storing, in a predetermined storage area 340, configuration parameters for the cryptographic algorithm to be applied by the module 320. An example of a management message carrying new configuration parameters for the cryptographic algorithm is the following:

| header | digital signature | application header | tag | msg length | msg data |
|---|---|---|---|---|---|
| 02 70 00 00 22 0D 00 00 30 30 FE F3 01 00 00 00 00 00 00 | 3C 40 F9 DD C2 16 19 47 | 32 00 00 00 | 02 | 06 | 30 31 32 33 34 35 | wherein the tag field being equal to "02" hex means that the message is intended to modify the cryptographic algorithm configuration parameters, and the data field carries six bytes (message length field equal to 06 hex), of value 30 31 32 33 34 35 hex in the shown example, carrying six new configuration parameters.

Other types of data structure can be envisaged, depending on the nature of the cryptographic algorithms to be adopted, on the configuration parameters used by the algorithms, and the like.

The sixth module 330 performs tasks similar to those performed by the fifth module 325, but in respect of the encryption/decryption keys to be used by the cryptographic algorithm for encrypting/decrypting the SMS messages. Similarly to the fifth module 325, the sixth module 330 processes the data structure coming from the third module 315 so as to put the data carried by the received message into a form suitable for storing, in an encryption/decryption keys database 345, the keys to be used by the cryptographic algorithm implemented by the module 320.

An example of a management message carrying new configuration parameters for the cryptographic algorithm is the following:

| header | digital signature | application header | tag | msg length | msg data |
|---|---|---|---|---|---|
| 02 70 00 00 24 0D 00 00 30 30 FE F3 01 00 00 00 00 00 00 | 3A 40 F9 DD C2 16 F8 A0 | 32 00 00 00 | 03 | 08 | 31 32 33 34 35 36 37 38 | wherein the tag field being equal to "03" hex means that the message is intended to modify the encryption/decryption keys of the cryptographic algorithm, and the data field carries six bytes (message length field equal to 08 hex), of value 31 32 33 34 35 36 37 38 hex in the shown example, carrying a new key eight byte long.

Also in this case, other types of data structures can be envisaged, depending on the nature of the cryptographic algorithms to be adopted, on the configuration parameters used by the algorithms, and the like.

The fourth, fifth and sixth modules 320, 325 and 330 interact with a seventh module 350, which processes the received SMS messages, as well as the SMS messages to be sent by the MS 120, in order to decrypt/encrypt the messages. In particular, the seventh module 350 interacts with the first module 305, from which the seventh module 350 receives the incoming messages that are not detected as configuration messages, but as (encrypted) SMS messages received by other MSs.

The seventh module 350 interacts with a further, eighth module 355, which allows a proper presentation to the MS's user (e.g. through the display 301) of the received, decrypted messages, through the MS display device, and with a ninth module 357, interacting in turn with the module 355, enabling the MS user to compile, using the MS keyboard 303, a new SMS message, to be encrypted and sent to an intended destination MS.

The tasks performed by the seventh module 350 include management of the encryption/decryption of messages. In particular, the encrypted SMS messages received by the MS 120 are sent, by the module 310, to the seventh module 350; the seventh module invokes the fifth module 325 and gets the configuration parameters for the cryptographic algorithm, invokes the sixth module 330 and gets the decryption key, then invokes the fourth module 320 for starting the cryptographic algorithm, passing thereto the configuration parameters and the decryption keys. The received, encrypted message can thus be decrypted, and, through the eighth module 355, the information content thereof can be displayed to the user of the MS 120 on the display 301.

Dually, when an encrypted SMS message has to be sent, the seventh module 350 receives, from the ninth module 357, the plaintext of the new message, for example inputted by the MS user via the keyboard 303. The seventh module 350 invokes the fourth module 320, to start the cryptographic algorithm, and passes thereto the configuration parameters for the cryptographic algorithm and the encryption key got from the fifth and sixth modules 325 and 330. The plaintext message is thus encrypted into a ciphertext, and it is then sent to the first module 305, which manages the message transmission.

In an embodiment of the present invention, the seventh module 350 also manages an encrypted messages repository 360 (in practice, a reserved memory area of the mobile phone or of the SIM 307), in which the SMS messages received from other MSs are saved.

The seventh module 350 may also manage a phonebook 365, stored for example in a prescribed memory area of the mobile phone or of the SIM 307, including wherein the mobile phone numbers of the users of the same users group(s) as the user of the MS 120, with which encrypted SMS messages can be exchanged.

In particular, differently from the usual received/sent SMS message archive and phonebook usually implemented in mobile phones, either the encrypted message repository 360, or the phonebook 365, or both, may be rendered accessible only on condition that the user inputs a security code (a Personal Identification Number—PIN).

It can be appreciated that the generic MS 120 thus treats the cryptographic algorithm as split into two main components: the cryptographic algorithm code, which is autonomously managed by the fourth module 320, and the cryptographic algorithm configuration parameter(s), managed instead by the fifth module 325 (in addition, the encryption/decryption key(s) are managed by the sixth module 330).

In this way, it is possible to either modify the cryptographic algorithm configuration parameters, or the cryptographic algorithm code (and the encryption/decryption keys).

The security management server 155 may thus decide to modify the cryptographic algorithm code, or the cryptographic algorithm configuration parameters only, depending on the level of security desired. Changing the cryptographic algorithm configuration parameters is expected to be a relatively fast operation, involving the exchange of a small amount of information between the security management server 155 and the generic MS 120; in particular, a few or even a single SMS message can be sufficient for delivering to the MSs new encryption algorithm parameters. Differently, modifying the cryptographic algorithm core is expected to be an operation involving the exchange of a substantial amount of information, necessitating for example several tens of SMS messages. Preferably, a GPRS connection may be exploited, when supported; in this case, when the security management server 155 wishes to upgrade/update the cryptographic algorithm/configuration parameters, the security management server 155 may signal this event to the generic MS user, for example via an SMS; if the user accepts to perform the upgrade/update at that time, he/she sets up a GPRS connection, through which the server 155 downloads the new configuration information.

In addition, the security management server 155 may decide to simply change the encryption/decryption keys.

The cryptographic process configuration data received by the MS 120 from the security management server 155, after the authenticity check performed by the second module 310, are decrypted by the third module 315, which then manages the installation thereof, for example, if the received data involve a change in the cryptographic algorithm core, the third module 315 installs the new algorithm core, and the new cryptographic algorithm thus becomes part of the database 335 of cryptographic algorithms available at the MS 120; if instead the received data involve updating the configuration parameters of an already installed cryptographic algorithm core, the third module adds the new configuration parameters in the database 340. Similarly, if new encryption/decryption keys are received, the third module 315 inserts the new keys in the keys database 345.

Several cryptographic algorithms are known in the art and can be exploited to implement the method according to the described embodiment of the present invention; suitable cryptographic algorithms are for example the DES, an acronym that stands for Data Encryption Standard, the IDEA (International Data Encryption Algorithm), the RC5.

An exemplary parametric cryptographic algorithm is the so-called "Triple-DES" (TDES or 3-DES), which is a more secure variant of the basic DES algorithm. 3-DES uses three encryption keys K1, K2 and K3, typically of 56 bits each, for a total key length of 168 bits. Roughly speaking, the 3-DES algorithm calls for applying the DES algorithm three times, each time using one of the three different keys. By indicating with $DES_{Ki}$ the operation of encrypting generic input data using the basic DES algorithm with the key Ki (where i=1, 2 or 3), and with $DES^{-1}_{Kj}$ the operation of decrypting generic data using the inverse of the DES algorithm, with the key Kj (where j=1, 2 or 3), the 3-DES algorithm can be defined to be a parametric encryption algorithm, in the sense that the different results can be achieved by properly selecting the type (direct or inverse) and the order according to which the basic DES algorithm (or its inverse) is applied to a generic input.

By way of example, given generic, non-encrypted input data D, one possible way of performing a 3-DES encryption of the data D is the following:

a) encrypting the data D by applying the DES algorithm with the key K1, to obtain an intermediate, encrypted result R1:

$$R1=DES_{K1}[D];$$

b) decrypting the intermediate result R1 by applying the inverse of the DES algorithm using the key K2, to obtain a second intermediate result R2:

$$R2=DES^{-1}_{K2}[DES_{K1}[D]]; \text{ and}$$

c) encrypting the intermediate result R2 by applying again the DES algorithm, but this time with the key K3, to obtain the final result R3, representing the encrypted version D* of the input data D:

$$D^*\equiv R3=DES_{K3}[DES^{-1}_{K2}[DES_{K1}[D]]].$$

This sequence of operations gives as a result an encrypted version D* of the generic input data D.

In order to decrypt the encrypted data D*, so as to retrieve the original input data D, the same actions need to be performed, but in reverse order.

A different encrypted version of the same input data D can be obtained if, keeping the same keys, the order by which the DES and inverse DES algorithm are applied is changed. For example, a second encrypted version D** of the same input data D can be obtained in the following way:

$$D^{**}=DES_{K3}[DES^{-1}_{K2}[DES^{-1}_{K1}[D]]].$$

which differs from the previous example for the fact that the first process to which the input data D are submitted is an inverse DES, with the key K1.

A still different, third encrypted version D*** of the same input data D can be obtained in the following way:

$$D^{***}=DES^{-1}_{K3}[DES_{K2}[DES_{K1}[D]]].$$

The three examples given above can be interpreted as corresponding to three different sets of configuration parameters for the cryptographic algorithm: a first set {1;−1;1}, a second set {−1;−1;1} and a third set {1;1;−1}. More generally, the operation of the 3-DES cryptographic algorithm depends on a specific set {P1;P2;P3} of three parameters P1, P2 and P3, wherein the parameter P1 corresponds to the first operation performed on the generic input data D, using the first key K1, to obtain the first intermediate result R1, the parameter P2 corresponds to the second operation performed on the first intermediate result R1, using the second key K2, to obtain the second intermediate result R2, and the parameter P3 corresponds to the third operation performed on the second intermediate result R2, using the third key K3, to obtain the final result R3. Each of the parameters P1, P2 and P3 can take value 1 or −1, wherein the value 1 identifies that the corresponding operation is a DES algorithm, whereas the value −1 identifies that the operation is an inverse DES algorithm.

Thus, by changing the values of the parameters P1, P2 and P3, it is possible to generate different encrypted versions of same input data, even if the same basic encryption algorithm and the same keys are used.

For example, having in mind the general structure of a management SMS message depicted in FIG. 5, a possible management message carrying new configuration parameters for the cryptographic algorithm is the following:

| header | digital signature | application header | tag | msg length | msg data |
|---|---|---|---|---|---|
| 02 70 00 00 1F 0D 00 00 30 30 FE F3 01 00 00 00 00 00 00 | 45 40 F9 EF 00 16 19 9E | 32 00 00 00 | 02 | 03 | P1 P2 P3 | wherein the tag field being equal to "02" hex means that the message is intended to modify the configuration parameters of the cryptographic algorithm, and the data field carries three bytes (message length field equal to 03 hex), of value (symbolic) P1 P2 and P3, which are the three new configuration parameters. By way of example only, a value for the generic parameter Pi equal to 01 hex may mean "apply the direct DES algorithm", whereas a value equal to F1 hex may mean "apply the inverse DES algorithm". In this case, setting the first set of parameters {1;−1;1} means having the last three bytes of the SMS message equal to 01 F1 01 hex; setting the second set of parameters {−1;−1;1} means having the last three bytes of the SMS message equal to F1 F1 01; setting the third set of parameters {1;1;−1} means having the last three bytes of the SMS message equal to 01 01 F1.

Other possible configuration parameters for the 3-DES are for example the number of encryption/decryption keys and the way such keys have to be used in the different instantiations of the DES or inverse DES algorithm (in the above example, three different keys K1, K2 and K3 have been assumed, but the keys may be for example two, and be re-used in more than one instance of the DES or inverse DES).

For example, let the encryption method known as "7-DES" be considered, which, similarly to the 3-DES, calls for applying the basic DES or inverse DES algorithm seven times; three keys K1, K2, K3 can be used (i.e., a number of keys lower than the number of basic instantiations of the DES or inverse DES basic algorithms). A configuration parameter may in this case specify the order the three keys are to be used (for example, K1, K2, K3, K1, K2, K3, K2).

More generally, the configuration parameters may be viewed as forming a multidimensional matrix, in which there is specified which, how many times and in which sequence the basic cryptographic algorithms are to be applied, how many encryption/decryption keys are to be used, and in which order.

The operation of the generic MS 120 as far as the OTA configuration of the cryptographic process and the management of secure SMS messages are concerned will be now explained in greater detail, making reference to the schematic (and greatly simplified) flowcharts of FIGS. 4A and 4B.

Referring firstly to FIG. 4A, when the generic MS is switched on (and connected to a mobile communications network, such as the network 100), it listens for incoming messages (block 405); in the following, reference will for simplicity be made to SMS messages only, being intended that this is not a limitation of the invention, because other types of messages can be envisaged (in particular, as far as configuration messages are concerned, either SMS or GPRS communications are feasible).

If there are no incoming messages (output branch N of decision block 405), the MS may check whether there is a message to be sent (decision block 407) and, in the affirmative case (exit branch Y of decision block 407) invoke (connector B) a send message routine to be described later, otherwise the operation flow jumps back to block 405.

If an incoming message is detected (output branch Y of decision block 405), the message is received (block 410), and then the (first module 305 of the) MS checks whether the received message is a configuration message or not (decision block 415).

In the negative case (exit branch N of decision block 415), the received message is decrypted (block 420), invoking the cryptographic algorithm (the seventh module 350 invokes the fourth, fifth and sixth modules 320, 325 and 330), and the decrypted message is then displayed to the user (on the display 301) and stored (possibly in encrypted form) in the message repository 360 (block 425).

If instead the incoming message is found (by the first module 305) to be a configuration message (exit branch Y of decision block 415), the MS (after having verified the authenticity of the message sender), checks whether the message carries an upgraded version of the cryptographic algorithm (block 430), or new configuration parameters for an already installed cryptographic algorithm (block 435), or, possibly, new encryption/decryption key(s) (block 440); in particular, this actions may be performed by the third block 315 of FIG. 3. In the first case (exit branch Y of decision block 430), the cryptographic algorithm is upgraded (the third block 315 installs the new cryptographic algorithm core) in the cryptographic algorithm database 335 (block 445); in the second case (exit branch N of decision block 430, and exit branch Y of decision block 435), the new configuration parameters are stored (third block 315 stores them) in the configuration parameters database storage area 340 (block 450). In the third case (exit branch N of decision blocks 430 and 435, and exit branch Y of decision block 440) new encryption/decryption keys are stored in the key databases 345 (block 455).

The operation flow then jumps back to the beginning (connector A).

In case the received message is a plaintext (not encrypted) message, no decryption process is necessary, and the message is directly displayed.

The operations performed by the MS when there is a new message to be sent (in encrypted form) are schematically depicted in FIG. 4B. After having received the compiled SMS message from the ninth module 357, the seventh module 350 invokes the fifth and sixth modules 325 and 330 and gets from the respective storage areas 340 and 345 the configuration parameters and the encryption keys for the cryptographic algorithm (block 465). Then, the cryptographic algorithm is invoked (block 470): the seventh module 350 calls the fourth module 320 and passes thereto the configuration parameters, the plaintext message and the encryption keys, and the message to be sent is thus encrypted (block 475). The encrypted message is then sent to the intended destination, for example the MS 120r.

In case the message to be sent is not to be encrypted, no encryption process is performed, and the message is sent in plaintext.

Delivery of the encrypted message to the intended destination MS is accomplished conventionally, as in the case of a plaintext message; particularly, in the case of an SMS message, the message is sent to the SMSC 140, which stores the message, and delivers it, either immediately or as soon as possible, to the correct destination.

The message travels all the way from the sender to the receiver is encrypted form, and it is stored encrypted at the SMSC; thus end-to-end messaging security is achieved.

Thanks to the present invention, the robustness of the cryptographic process exploited for implementing secure end-to-end messaging is increased; not only the encryption/decryption keys, but also the configuration parameters of the cryptographic algorithm, or even the very cryptographic algorithm can be modified, so as to update/upgrade the cryptographic process. The update/upgrade is made OTA, so that it is not necessary to substitute the SIMs of the users. Several update/upgrade policies can be implemented; for example, while the encryption/decryption keys can be changed frequently, possibly even after every usage, the configuration parameters can be updated less frequently, for example once per month; the cryptographic algorithm can be changed on an even less frequent basis, or only when there is a reasonable doubt that it may have been cracked. Thus, great flexibility is provided.

It is pointed out that albeit, in the foregoing, the sender and the receiver mobile stations are shown as located in the same cell, this is not to be intended as a limitation, but merely as a pictorial simplification; in general, the sender and the receiving mobile station may be located either in the same cell or in different cells, either belonging to the same BSS or to different BSSs; even more generally, the sender and the receiver mobile stations might be connected to different mobile telephony networks.

In a still more general case, either the message sender or and the message receiver are not necessarily mobile stations: one of these two entities may for example be a (suitable) fixed telephony appliance, or a computer connected to the Internet.

The sender may decide to send the encrypted to a single intended receiver (so as to accomplish a secure, user-to-user messaging), or to a group of intended receivers, for example to all the users included in a respective users group (e.g., the users group "Ga" of FIG. 2). The sender may for example exploit an address book adapted to manage groups of contacts, in particular groups of users' mobile phone numbers (e.g., an address book of the type managed by the electronic mail application software).

Preferably, but not necessarily, an acknowledgment policy may implemented at the MSs, according to which whenever an encrypted SMS message is received, the receiver MS automatically sends to the message sender an acknowledgement.

It is also pointed out that although described making reference to end-to-end SMS messages, the invention is not limited to this kind of messaging, but in general to any type of messaging, being for example applicable to cell broadcast messages.

The invention claimed is:

1. In a mobile communications network having mobile communications capabilities and supporting a secure messaging service that allows a message sender and at least one message receiver exchanging messages encrypted by means of a cryptographic process performed by the message sender, so as to obtain an encrypted message that can be decrypted by a corresponding cryptographic process performed by the intended message receiver, wherein at least one among the message sender and the message receiver is a user of the mobile communications network, a method comprising:

modifying, via the mobile communications capabilities of the mobile communications network, a parametric cryptographic algorithm used by said user of the mobile communications network for performing said cryptographic process, wherein the parametric cryptographic algorithm comprises a plurality of combinable cryptographic sub-algorithms; and managing modifications to the parametric cryptographic algorithm via a messaging security manager server connected to the mobile communications network and to the Internet and having an interface allowing the performance of management operations, wherein modifying said parametric cryptographic algorithm comprises:

sending, over a wireless communication link to a mobile station of at least one of the message sender and the message receiver, at least one management message comprising a set of one or more configuration parameters which define a combination of at least two of the plurality of combinable cryptographic sub-algorithms; and modifying at least one of the combinable cryptographic sub-algorithms.

2. The method according to claim 1, further comprising modifying encryption/decryption keys to be used by said user of the mobile communications network for encrypting/decrypting a message, said modifying the encryption/decryption keys being accomplished by using communications capabilities of the mobile communications network.

3. The method according to claim 2, further comprising modifying at least one of the combinable cryptographic sub-algorithms, modifying configuration parameters, and modifying encryption/decryption keys according to respective time schedules.

4. The method according to claim 1, wherein modifying, via the mobile communications capabilities of the mobile communications network, comprises using a messaging service of the network.

5. The method according to claim 1, wherein modifying, via the mobile communications capabilities of the mobile communications network, comprises using a packet radio service of the network.

6. A secure messaging system comprising:

a mobile communications network having mobile communications capabilities and supporting a messaging service;

a message sender and at least one message receiver, wherein at least one among the message sender and the message receiver is a user of the mobile communications network;

a cryptographic process performed by the message sender to encrypt a message to be sent to the at least one receiver;

a messaging security manager hardware server, for managing modifications to a parametric cryptographic algorithm, connected to the mobile communications network and to the Internet and having an interface allowing the performance of management operations; and a corresponding cryptographic process performed by the message receiver to decrypt the encrypted message once received, the mobile communications network being adapted to modify the parametric cryptographic algorithm used by said user of the mobile communications network for performing said cryptographic process by using the mobile communications capabilities thereof, and comprising a plurality of combinable cryptographic sub-algorithms, wherein the mobile communications network is configured to modify said parametric cryptographic algorithm by:

sending, over a wireless communication link to a mobile station of at least one of the message sender and the message receiver, at least one management message comprising a set of one or more configuration parameters which define a combination of at least two of the plurality of combinable cryptographic sub-algorithms for performing the cryptographic process; and modifying at least one of the combinable cryptographic sub-algorithms.

7. The system according to claim 6, wherein the mobile communications network is adapted to modify either one or the other or both of said parametric cryptographic algorithm and configuration parameters.

8. The system according to claim 7, wherein the messaging security manager hardware server is adapted to communicate with the user of the mobile communications network via a network messaging service.

9. The system according to claim 7, wherein the messaging security manager server is adapted to communicate with the user of the mobile communications network via a network packet radio service.

10. A mobile station for use in a mobile communications network having mobile communications capabilities and supporting a messaging service, the mobile station being adapted to implement a cryptographic process for encrypting/decrypting messages to be sent to/received from a message destination/sender,
the mobile station being further adapted to have a parametric cryptographic algorithm comprising a plurality of combinable cryptographic sub-algorithms, used for performing said cryptographic process, modified by using the communications capabilities of the mobile communications network, wherein the cryptographic algorithm is modified by:
receiving, at the mobile station via a wireless communication link, at least one management message comprising a set of one or more configuration parameters which define a combination of at least two of the plurality of combinable cryptographic sub-algorithms for performing the cryptographic process; and
modifying at least one of the combinable cryptographic sub-algorithms,
wherein modification of the at least of one combinable cryptographic sub-algorithms is managed by a security management server connected to the mobile communications network and to the Internet.

11. The mobile station according to claim 10, further adapted to manage modifications of either one or both of the plurality of combinable cryptographic sub-algorithms and the configuration parameters.

12. The mobile station according to claim 11, further adapted to have encryption/decryption keys used by the cryptographic process for encrypting/decrypting messages modified by using the mobile communications capabilities of the mobile communications network.

13. The mobile station according to claim 10, wherein said mobile communications capabilities of the mobile communications network comprises one or both among a messaging service, and a packet radio service.

14. The mobile station according to claim 10, further comprising a user terminal equipment and a subscriber identity module operatively associated therewith.

15. The mobile station according to claim 14, wherein at least one among the cryptographic process and operations for the modification of the cryptographic algorithm are performed by the user terminal equipment.

16. The mobile station according to claim 14, wherein at least one among the cryptographic process and operations for the modification of the cryptographic algorithm are performed by the subscriber identity module.

17. The mobile station according to claim 16, wherein the cryptographic process and operations for the modification of the cryptographic algorithm are performed by the subscriber identity module.

18. A subscriber identity module card adapted to be operatively associated with user terminal equipment for forming a mobile station adapted for use in a mobile communications network having mobile communications capabilities and supporting a messaging service, the mobile station being adapted to implement a cryptographic process for encrypting/decrypting messages to be sent to/received from a message destination/sender,
the subscriber identity module card being adapted to have a parametric cryptographic algorithm modified by using the communications capabilities of the mobile communications network, the parametric cryptographic algorithm being used by the mobile station for performing said cryptographic process and comprising a plurality of combinable cryptographic sub-algorithms,
wherein the parametric cryptographic algorithm is modified by:
receiving, at the subscriber identity module card via a wireless communication link, at least one management message comprising a set of one or more configuration parameters which define a combination of at least two of the plurality of combinable cryptographic sub-algorithms for performing the cryptographic process; and
modifying at least one of the combinable cryptographic sub-algorithms,
wherein modification of the at least of one combinable cryptographic sub-algorithms is managed by a security management server connected to the mobile communications network and to the Internet.

19. A subscriber identity module card adapted to be operatively associated with user terminal equipment for forming a mobile station adapted for use in a mobile communications network having mobile communications capabilities and supporting a messaging service, the mobile station being adapted to implement a cryptographic process for encrypting/decrypting messages to be sent to/received from a message destination/sender,
the subscriber identity module card being adapted to have a parametric cryptographic algorithm modified by using the communications capabilities of the mobile communications network, the parametric cryptographic algorithm being used by the mobile station for performing said cryptographic process and comprising a plurality of combinable cryptographic sub-algorithms,
wherein the parametric cryptographic algorithm is modified by:
receiving, at the subscriber identity module card via a wireless communication link, at least one management message comprising a set of one or more configuration parameters which define a combination of at least two of the plurality of combinable cryptographic sub-algorithms for performing the cryptographic process; and
modifying at least one of the combinable cryptographic sub-algorithms, wherein modification of the at least of one combinable cryptographic sub-algorithms is managed by a security management server connected to the mobile communications network and to the Internet; and
wherein the subscriber identity module card is adapted to perform said cryptographic process.

* * * * *